United States Patent [19]

Ananth et al.

[11] Patent Number: 5,034,828
[45] Date of Patent: Jul. 23, 1991

[54] SLIDER WITH PIEZO-BOSS

[75] Inventors: Raju S. Ananth, San Jose; Michael A. Verdone, Hillsborough, both of Calif.

[73] Assignee: Unisys Corp., Detroit, Mich.

[21] Appl. No.: 422,186

[22] Filed: Oct. 16, 1989

Related U.S. Application Data

[62] Division of Ser. No. 334,628, Apr. 7, 1989, abandoned.

[51] Int. Cl.$^5$ ................................................. G11B 5/60
[52] U.S. Cl. ........................................ 360/75; 360/103
[58] Field of Search .................................. 360/103, 75

[56] References Cited

FOREIGN PATENT DOCUMENTS 56-107363 8/1981 Japan .
58-153270 9/1983 Japan .

Primary Examiner—Robert S. Tupper
Attorney, Agent, or Firm—John J. McCormack; Mark T. Starr

[57] ABSTRACT

Salient embodiments comprise a magnetic recording slider whose record-confronting face is characterized by two or three rails wherein stiction forces are counter-acted by provision of piezo-electric boss means on one or several rails, or therebetween.

13 Claims, 8 Drawing Sheets

*- AIR BEARING SURFACE (ABS)

AIR FLOW

FIG. 14. WEAR TEST MRX NO STICK SLIDER. MRX SLIDER. (SEE FIG. 1A.)

FIG.15. WEAR TEST NO STICK SLIDER. MRX SLIDER. ~20Å LUBE.

FIG. 16. WEAR TEST MRX DISC.

SLIDER WITH PIEZO-BOSS

This is a division of application Ser. No. 334,628, filed Apr. 7, 1989, now abandoned.

This invention relates to high capacity magnetic recording discs and more particularly to improved magnetic head sliders therefor.

Workers in the art of magnetic disc recording for computer memory and related purposes are familiar with certain problems suffered by the magnetic head sliders used to present the transducer means to the rotating disk. One problem is that of "stiction" (forces) developed when a slider is resting on the magnetic disc surface (e.g., on a lube film thereon). Stiction forces can be undesirably large and counter-productive, especially under the "sudden start" conditions usually desired—e.g., overloading the disc-rotating motor—[they can lead to damage to the slider and/or to the disc surface].

Stiction can commonly induce a transfer of disc-material onto the slider rails; at times causing a flying slider to crash into the disc and render it useless. Such crashes become more and more likely as sliders are made to fly lower and lower [presently as little as about 20 micro-inches above the disc, a flying height which obviously can lead to disastrous problems if just a few micro-inches of material is picked up on a slider rail]. It is an object of this invention to ameliorate such problems by providing anti-stiction boss means arranged to protrude below the surface of the slider.

Such stiction and related problems are exacerbated by the current trend toward reducing "lube thickness". Conventionally now, a disc surface is lubricated with a somewhat uniform coating of an industry-standard polymer (e.g., by Brayco, Krytox, etc.) normally, at least 50–70 $A°$ in depth—being depleted in use to about 11–20 $A°$, which approximates a mere mono-atomic layer and thus is thought to be as thin as possible for such a continuous film. A head/medium interface that requires no lubrication at all would be "ideal" and would avoid such depletion and attendant "crash" incidence. But, for the present, workers insist that some sort of lube is needed to reduce interface friction.

Thus, some lube is believed necessary—e.g., to prevent a slider from prematurely "gouging" or otherwise marring or digging-into the disc surface, and soon "crashing". Conventional sliders (e.g., 3680 Memorex DD) conventionally operated (50 $A°$ film of lube) are expected to have a useful life of about 10,000 stop-start cycles (cf. a contact start-stop test is widely accepted as a measure of media integrity). "Low-lube" conditions reduce this to the order of a mere 1,000 cycles; (unacceptable in the industry). Workers theorize that a "crash" is often presaged when disk-coating material is transferred onto a slider surface—commonly because too much heat is developed by rubbing of the slider against the disc coating (such overheating evidently breaking-down the coating binder constituent and allowing the slider to pick-up disc coating matter).

Workers would like to reduce lube thickness (well below the mentioned 50–70 $A°$). But such "low-lube" conditions are not yet acceptable. They are viewed as attenuating the useful operating life of a disc-slider combination. For instance, we have seen lube applied in the 20–60 $A°$ range limit operating life to about 1,000 start-stop test cycles, whereas an "acceptable" operating life to workers corresponds to about 5,000–10,000 cycles or more [Note: one start-stop cycle will be understood as initiated when a slider at rest is made to speed up and take off to over-fly the disc and then land thereon to be returned to rest].

It is a further object of this invention to ameliorate these difficulties and allow workers to not only overcome stiction and related problems with conventional lube levels but to do so under "low lube" conditions and under conditions allowing sliders to fly ever closer to the magnetic disc surface and still survive 10K contact start-stop cycles. This is proposed by providing the mentioned boss means on the slider.

BACKGROUND, INVENTION FEATURES

In thinking of ways to relieve the mentioned "stiction" problems, a number of approaches come to mind. For instance, one might consider changing the traditional "circular" path of the slider about the magnetic disc to an elliptical path. This might reduce stiction effects (by imparting a centrifugal force to separate the slider from the disc), but such a solution seems difficult to implement and might present undesirable side effects.

Or, one might curve the slider air-bearing surfaces (rail faces) to reduce plane-to-plane contact with the disc. However, such a curved surface is not easy to visualize and design and is problematic to manufacture in quantity (consistent with yielding a slider that will fly stably just a few micro-inches above a disc). Moreover, the resulting converging/diverging air-flow paths could well make the slider unstable.

Or, one might apply a high frequency vibration to the slider disc just before "start-time" to release the "stiction bond". This has been tried but is not viewed as reliable.

Or, as revealed in the IBM TDB Volume 25, #9 Feb. 1983, one might heat the disc lubricant to reduce its viscosity and thereby hope to reduce stiction. However, this is somewhat impractical, e.g., since it requires special heating means and related power and indicates problematic residual thermal stresses in the slider suspension system [flexure, load beam, etc.].

Thus, the art is still awaiting a practical solution to "stiction" and related problems; a solution which is simpler to implement than the foregoing and which avoids their undesirable side effects. Our invention provides "anti-stiction bosses" as such a solution. For instance, our technique is very simple to implement and brings no significant adverse side effects. In fact it has been somewhat surprising that such a simple boss means could solve these problems and that such a protruding boss could skid along the disc surface without injuring either itself or the disc. It was also surprising to realize some other advantages using this boss means, such as shorter, quicker "lift off" from the disc, relief of excessive stiction even under "heavy-lube" conditions, and allowing a "low-lube" disc to achieve satisfactory operating life.

BRIEF DESCRIPTION OF DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

2 is a plan view, FIG. 3 a side view, and FIG. 4 an end-view of this slider.

DESCRIPTION OF PREFERRED EMBODIMENTS

FIGS. 1-4 schematically illustrate a magnetic recording slider SL constructed and improved to include boss means according to principles of this invention. The slider, and related means discussed herein, will generally be understood as constructed and operating as presently known in the art, except where otherwise specified; the materials, methods, and devices and apparatus being implemented by known expedients according to present good practice.

Figure 1:
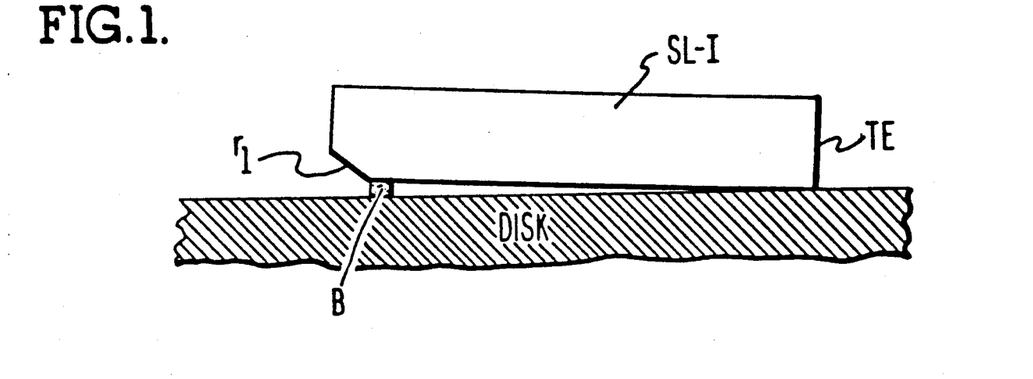
FIG. 1 is a schematic elevation of a representative slider embodiment provided with a boss means as shown parked on a magnetic recording disc, while FIG.

Thus, FIG. 1 depicts a conventional slider SL-I resting on an associated magnetic recording disc with a protruding "boss means", or metal slug B, raising the forward end of the slider off the disc surface. As better seen in FIGS. 2, 3 and 4, slider SL-I will be understood as a relatively conventional three-rail "Winchester" slider, e.g., of the type used with a high speed disc drive, such as the Memorex 3650. The slider is understood to carry thin film transducers tf (FIG. 4), mounted at, or adjacent, its trailing edge TE as known in the art. The three slider rails $A_1$, $A_2$, $A_3$ may be the order of 0.145 inch wide and include conventional ramp sections $r_1$, $r_2$, $r_3$, respectively, disposed forward of their leading edge portions. As workers know, the disc-confronting faces of the rails define a prescribed "flight-plane" f—f (see FIG. 4). Boss B will be understood as a tiny protrusion (e.g., relatively cylindrical or rectangular) projecting about 6 micro-inches below this "flight-plane" —cf. below the leading portion of the middle rail $A_2$ (see FIG. 4), preferably just aft of the associated ramp portion $r_2$.

Workers will recognize that so attaching a boss means "protuberance" relatively centrally off the forward portion of the slider will provide a "bias pitch" when the slider is at rest [on the stationary disc]—and of course will drastically reduce the contact area between slider and disc. [The slider faces are very, very smooth and flat—as is the disk surface and lube film thereon—and it is this interfacial contact of smooth flat surfaces that gives rise to "stiction"]. So providing a protuberance will, in turn, reduce (and can all but eliminate) the potential "stiction" force due to extreme flat conditions of the interface (note that slider SL-I now rests only on the boss and its trailing edge TE, rather than on the entire lengths of its slider rail faces).

Figure 4:
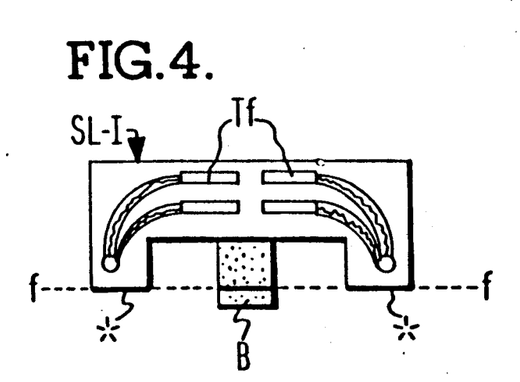

The boss B will preferably protrude only-barely beyond the slider level (e.g., a few micro-inches— preferably about 6u"13 below flight plane f—f in FIG. 4); for instance, just enough to induce a fast efficient lift-off when the disc is suddenly rotated, yet not enough to interfere with air flow along the slider rails while they fly just above the disc. A protrusion of 5-10 micro-inches is found quite satisfactory under the subject conditions as noted below in more detail [slider assuming to be flying about 24-35 micro-inches above the disc, which we assume was covered with a lube thickness of about 20-60 A°. Here assume about 250 A°=1 micro-inch]. A 6 micro-inch protrusion distance was settled-upon as a compromise between optimum head flying attitude (cf "bias") and a stable rest configuration. And with excessive protrusion, the boss might tend to shear-off on contacting the disc, whereas too little protrusion (e.g., 2 micro-inches or less) might not adequately relieve stiction or afford other advantages, such as "fast take off" (see below).

PREFERRED METHOD OF FABRICATION

It seems preferable to deposit such a miniscule metallic boss. Sputtering (e.g., SiC) is recommended here as a reliable, convenient way to deposit a boss B with a protrusion of a few micro-inches (a micro-deposition). Particularly good results and a simple method have been realized by sputtering the subject boss B (FIGS. 1-4) on the mid-rail of slider SL-I just before mounting the slider on its support flexure. To do this, one may readily mask-off all slider surfaces except at the boss site [as is well known in the art; photo resist might be used, as workers know]. Then, one can sputter the requisite "boss material" (6 micro-inch) thickness relatively uniformly.

One preferred "boss material" with such a conventional slider [i.e., a slider made of $Al_2O_3$ - TIC material] is silicon carbide (SiC). However, workers will realize that other such (hard) boss materials compatible with good adhesion to such a slider might comprise titanium carbide (TiC), $Al_2O_3$ or the like. [To make the boss of "slider material", or its mechanical equivalent, itself would, of course, be highly desirable, if such is convenient; e.g., this should yield optimal bonding, matching thermal expansivity, etc.].

Somewhat surprisingly, alumina ($Al_2O_3$) is a relatively non-preferred boss material since it is found relatively too soft when deposited in the amorphous state [e.g., surviving for only 4-5K cycles in a stop-start test]. And, while it is presumably quite a bit harder in the crystalline state, the heating necessary to induce crystallinity (in situ) is believed potentially harmful to the transducer on the slider.

It appears preferable to deposit "boss material" that is somewhat of a match in stoichiometry with the substrate slider material; else adhesion, etc. may be inadequate. For instance, for a slider like SL-I, we found that a pure tungsten slug adhered very poorly to the [ceramo-metallic]slider; apparently no "pure metal" would give good adhesion in such a case.

In any event, workers will appreciate that the "boss material" selected for deposition (or otherwise attached) will give sufficiently strong adhesion and hardness and other mechanical characteristics so as to remain in place and not significantly wear away during a full useful operating life [e.g., enduring at least 10K stop-start cycles, or a like durability test]. The boss, as mentioned, will protrude below the slider profile only sufficient to substantially relieve "stiction" and related problems, and very little more, lest its protruding profile disturb flight aerodynamics as it over-flies the disc [however, see below for the piezoelectric alternative which may be "withdrawn" during flight time, etc.].

RESULTS

The foregoing embodiment [FIGS. 1-4] was observed to give several surprising, highly desirable results.

More particularly, the so-improved slider [with protruding boss] was subjected to "stop-start" tests giving surprising indications of superior survivability (durability). (See data in FIG. 3). A "stop-start test" involves placing a slider in operating relation with a magnetic recording disc and stopping and starting the disc repeatedly to cause the slider to "take off" and "land" under conditions simulating actual use. The "survivability" of a slider-disc combination is adjudged according to the number of such stop-start cycles that can be run before significant degradation occurs, especially a "crash" or other catastrophic failure.

The subject embodiment [with the sputtered boss medially of the slider rails] has been run through a stop-start test on a normally lubricated disc [55 A° average applied depth of lube] in a high speed computer disc drive environment [Memorex 3680 disc drive]. Quite surprisingly, the protruding "boss" neither wore away nor did any perceptible damage to the disc surface over 10,000 cycles and beyond [and did not crash, as a conventional slider would likely have], while also evidencing a relatively lower "particle count" than with a "standard, non-bossed 3680 slider".

Figure 13:
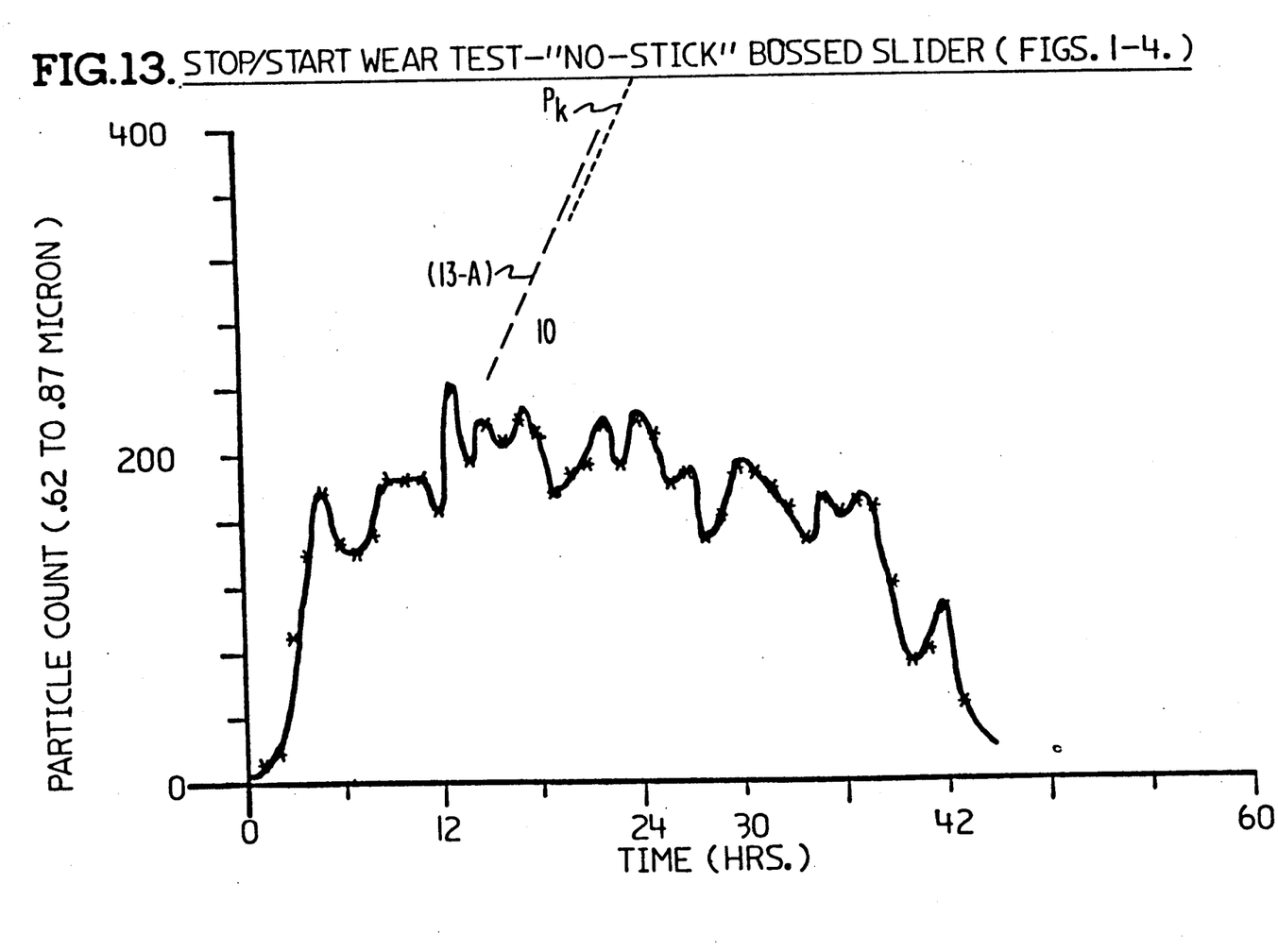
FIGS. 13, 14, 15 and 16 represent plots for certain embodiments, of "particle count" vs. "stop-start test time".

Such results are summarized in FIG. 13 [note above that the slider here took off and landed approximately 240 times per hour; that it was run concentrically around a single disc track; and that 10,000 start-stop cycles corresponds to approximately 10 years of "normal operating use". A normal 3680 slider would have lasted for about 3,000 cycles, and then crashed under these conditions].

This stop-start test (summarized in FIG. 13) is instructive. Note that during the first six to twelve hours a relatively high particle count [using a commercial grade particle counter—of 0.3-0.5 micron] was experienced—(cf. FIG. 13, e.g., peak at about 4 hours). This is rather normal and is believed to result from a "burnishing" of the peaks and asperities on the disc by the slider as it skids over the disc surface during take off and landing.

By way of illustration, one might also note that if a "crash" were imminent during such tests, it would typically be preceded, and "flagged", by an enormous rise in particle count [e.g., an "explosion" of two to three times the running count in just a few seconds; then a few minutes later, a "groove" would appear, worn into the disc's test track (e.g., three to four minutes in usual case)—this quickly followed by a catastrophic "crash" [due, principally, to pick-up of disc material by the slider]. Dotted-curve 13-A in FIG. 13 is intended to represent such an "exploded" count and imminent crash.

Figure 14:
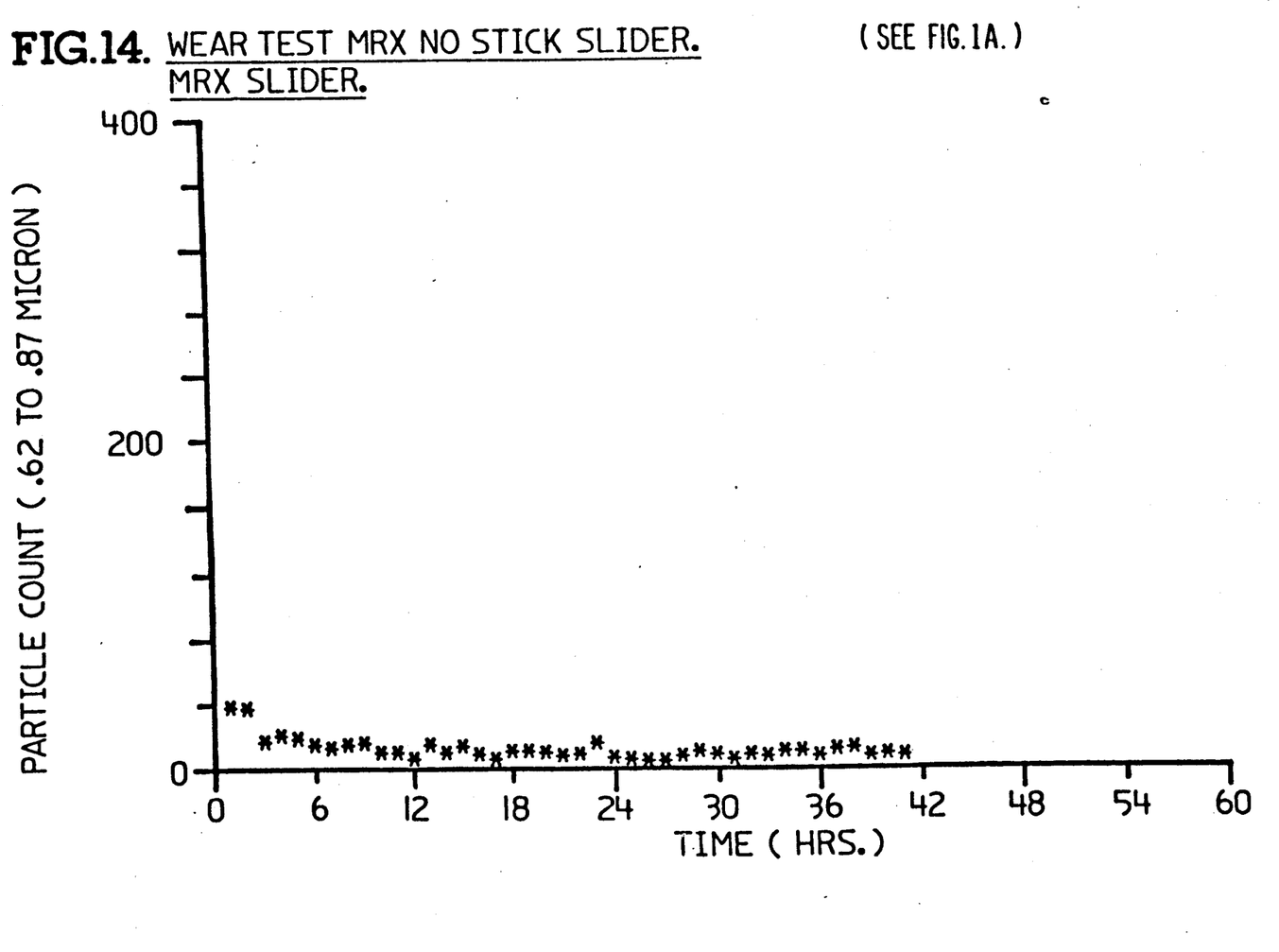

Also, during this such a test, it was noted, quite unexpectedly, that a so-improved slider [with center boss protruding] appeared to "lift-off" relatively more quickly than normal. For instance, where a "standard unbossed 3680 slider" will lift-off and begin to fly when disc velocity reaches about 300 inches per second, the subject "bossed" embodiment lifted off at about 250 inches per second. This is possibly due to the favorable "pre-bias", or tilt, created by the upstanding boss. Workers in the art will appreciate how valuable such an "early lift-off" is. This early lift-off is also believed responsible (at least partly) for the marked decrease in initial particle count often observed with the invention (e.g., see FIG. 14, discussed below). This early lift-off will also be desirable to more quickly bring the slider into a smooth, laminar-flow flight mode, reducing turbulence and noise during lift-off and generally affording better air bearing performance [allowing one to shorten the take off zones and thus increase available bit space on the disc and increase disc life]. At any rate, workers will highly value a slider allowing earlier lift-off (at lower disc rpm).

Figure 15:
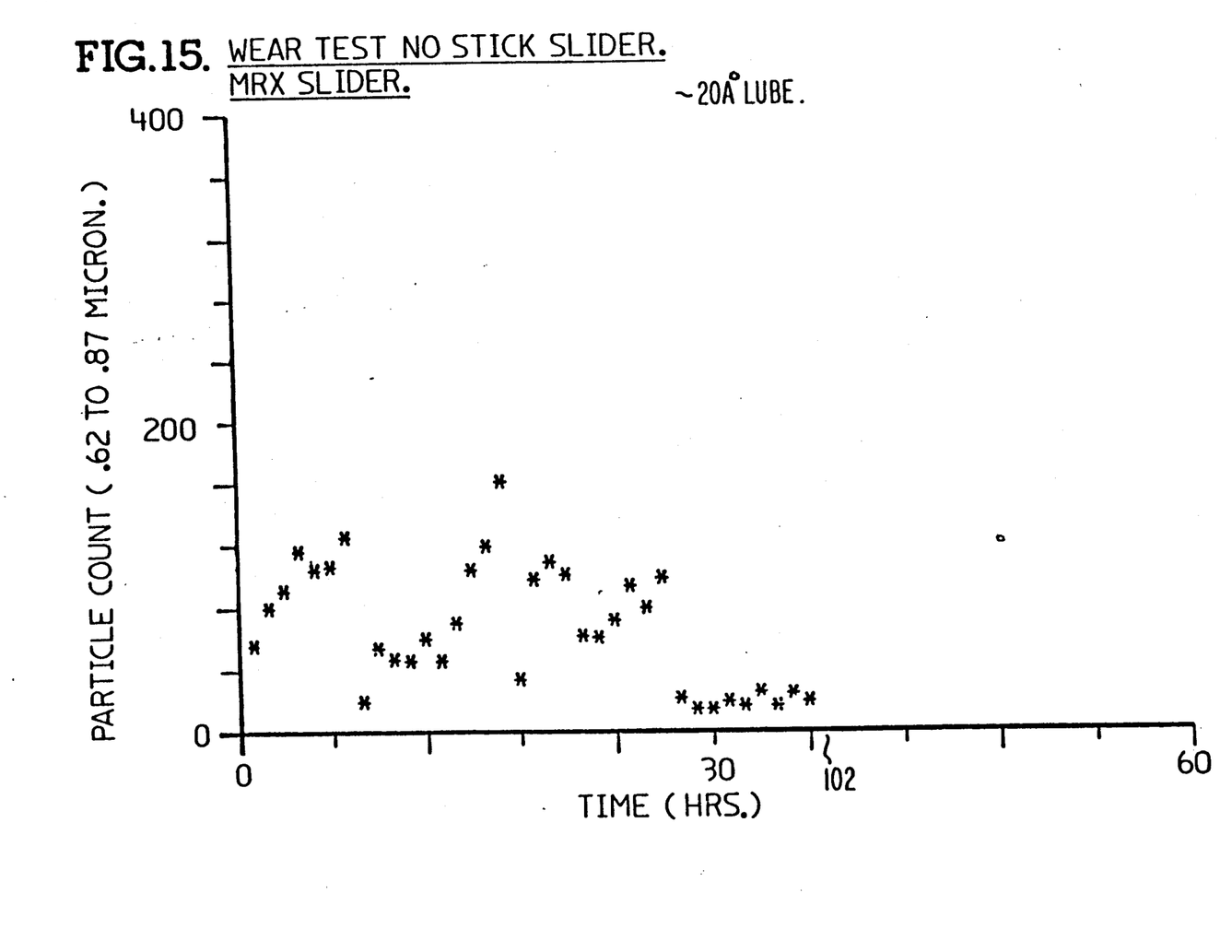
Figure 16:
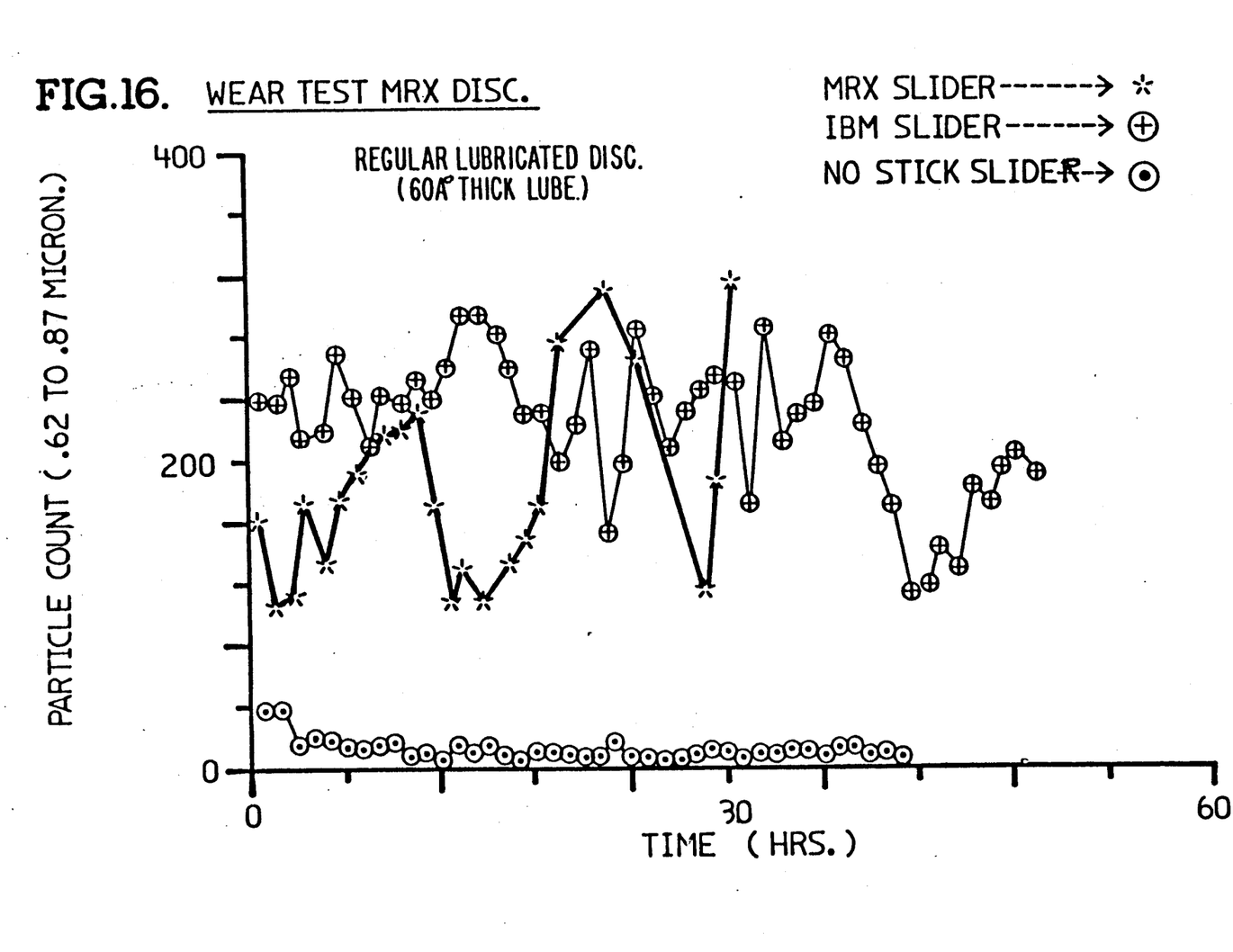

This embodiment was also surprisingly superior under "low lube" ("thin lube") conditions, e.g., surviving 10,000 start-stops on a "depleted" lube thickness [about 20 A° applied], while generating relatively less than the normal number of "particles" ("macro-particles" about a certain size; see FIG. 15 discussed below). Workers will appreciate how surprising such results are; e.g., where a normal slider is useless under such "depleted lube" conditions since it will typically crash at less than about 1,000 stop-start cycles, a mere "bossing" of the slider can give a normal operating life (10K+cycles).

Workers will appreciate how very significant such a "thin lube capability" is; and indeed how surprising it is that a slider with a protruding boss would need less lubrication—not more! Conventional thinking would have supposed that the boss would be more likely to dig-into the disc, even with "normal" lube thicknesses—indeed we examined the disc during start-stop testing, half-expecting to see a "groove" appear—yet none did! This was confirmed in a "Park Test", subjecting a "bossed-slider" to a normal 15 gm load as "parked" at rest on a normal 3680 disc for 48 hours or more. No change or special perceptible damage to the disc was apparent [that is, the disc was in no different condition than with a normal slider].

This embodiment was also tested on an abnormally heavily lubricated disc [300-1,000 A°, well above the usual lube thickness]; and for a considerable and surprising number of cycles (5,000) the bossed slider didn't appear to stick to the disc at all. This is in marked contrast to the performance of a "standard 3680 slider" which, under such heavy lube, shows visible stiction at once, accompanied by a "pinging" noise as the slider-support structure gets released from the disc.

Surprisingly, the only diverse effect of using such boss means seems to be that a bit of "debris" can be generated—evidently by boss-disc contact during rest times—but the amount and particle size are not significant.

Workers can appreciate the foregoing results are quite unexpected and a great surprise, really—especially since workers expected that (or wondered if) the protruding boss would dig into and damage the delicate disc surface (e.g., more than the smooth slider rails normally do). It was apparent that it did not—on the contrary, the "bossed" slider evidently does less damage, not more, to a disc surface.

In sum, workers will appreciate how surprising such results are using a boss-modified slider; how surprising that it performs better (longer) than a normal slider, whether on a normally-lubricated disc, on a lightly-lubricated disc, or on a heavily-lubricated disc [e.g., earlier lift-off], and how surprising that it lasts enormously longer than a normal slider in "thin lube" conditions. Workers will especially appreciate the prospects for using such "bossed sliders" under "low lube" (or even "no lube") conditions, especially where flying heights are abnormally low (e.g., below about 10 microinches).

Workers will note that the foregoing not only teaches one how to manufacture an improved slider, but also how to "retrofit" existing sliders [as do other embodiments below]. Workers will recognize that such a "boss means" can readily be affixed on a conventional three-rail slider [two-rail sliders would be similar]. Or, the-sliders may be manufactured exactly as presently, except that the manufacturer, or a third party, may simply add-on the desired boss means in the indicated manner. This is, of course, an option that makes the invention very practical since one needn't radically upset the normal manufacturing mode, or radically change the vendor specs. of such sliders. Of course, the invention is also easy to incorporate into a slider manufacturing process.

ALTERNATE EMBODIMENT: FIGS. 1A, 1B, 14, 15

Figure 1A:
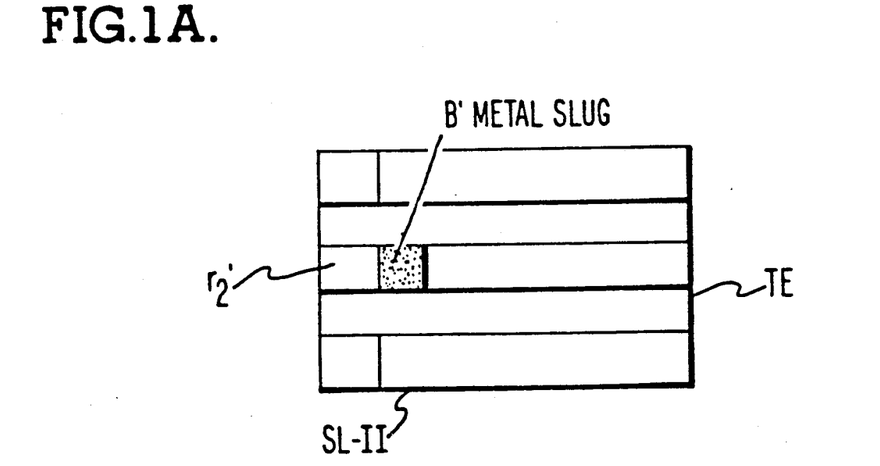
FIGS. 1A, 1B are respective plan and side views of a related embodiment.
Figure 1B:
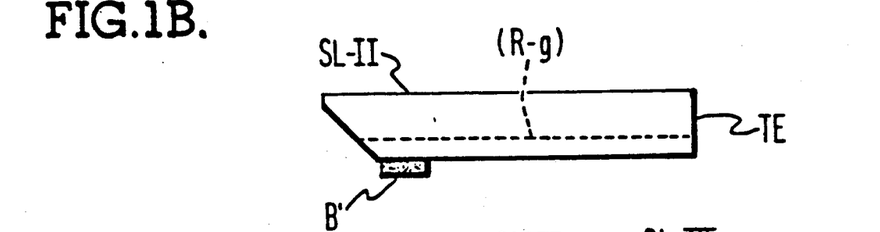
Figure 2:
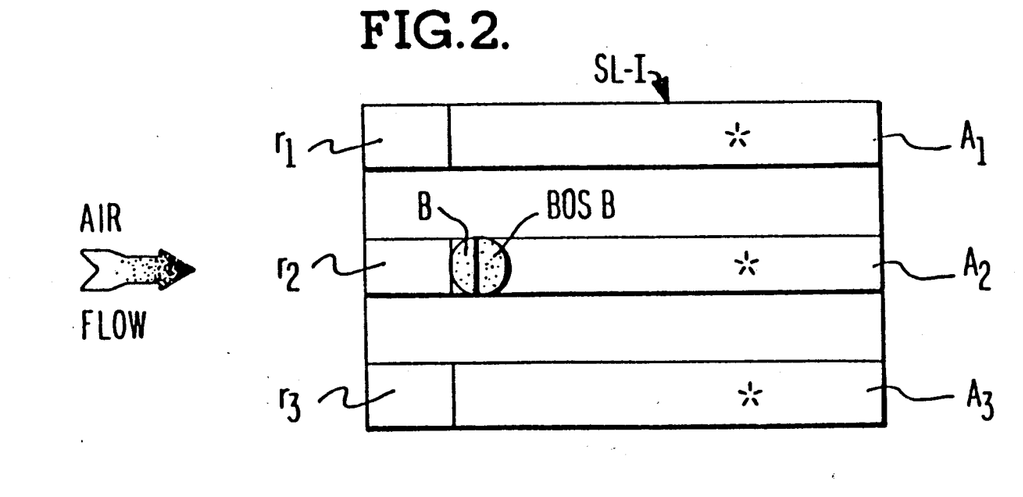
Figure 3:
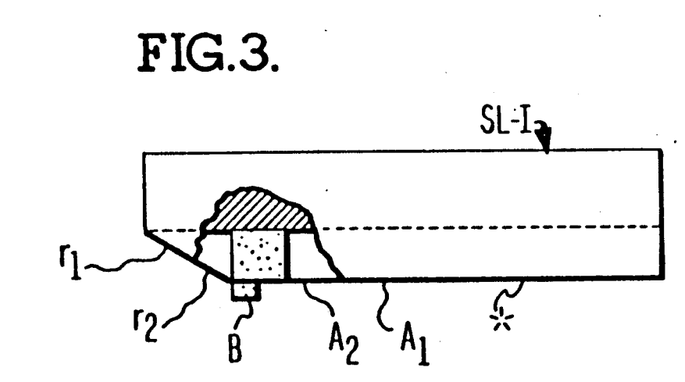

FIGS. 1A, 1B show a slider SL-II, replicating the slider of FIGS. 1-4 [e.g., with the same or like slider] with a similar boss B' deposited along the middle slider rail A'$_2$ just aft of its associated ramp r$_2$', except that, after completion, the middle rail A$_3$' is etched-away somewhat (as indicated along plane R-g in FIG. 1B) to essentially remove it as an air bearing surface. One might wonder what, if any, effect this has on slider performance (e.g., aerodynamics, etc.). Happily (and somewhat unexpectedly) we have found that there are no adverse effects at all.

In particular, slider performance during stop-start testing is superior (like that of the embodiment of FIGS. 1-4). For example, we tested this bossed slider design SL-II in start-stop tests like those mentioned. One such is summarized in the plot of FIG. 14 [conditions and presumptions the same as those mentioned for FIG. 13 above, etc.] with the so-improved slider being run over a normally lubricated [55 A° average depth] disc of the type used in Memorex 3680 disc drives.

Here, it will be seen that about 42 hours of stop-start testing was quite successfully survived [no crash, etc.], with an unusually-low particle count being experienced throughout this period. [Note: A "low" particle count generally corresponds to less contact at the slider-disc interface]. From this, one might infer that one may cut-away, or otherwise eliminate, the center rail on a three-rail slider [although one need not do so!] and mount a protruding "boss means" thereon, according to the invention, and still derive the same sort of superior, surprising improvements as found with the preceding embodiment (cf. FIGS. 1-4).

A like stop-start test was also performed on this "second embodiment" under "depleted lube" conditions [about 20 A° average lube depth]—with comparably-long, successful results [about 36 hours without crash, etc.]. This test is represented in FIG. 15 [otherwise derived the same as FIG. 14]. Of course, the "absolute" particle count here (FIG. 15) is considerably higher, as might be expected from the reduction in lube thickness and increased friction. However, this is still acceptable (is "clean enough") and should not lead to "crash" or other failure.

THIRD EMBODIMENT, FIG. 5

Figure 5:
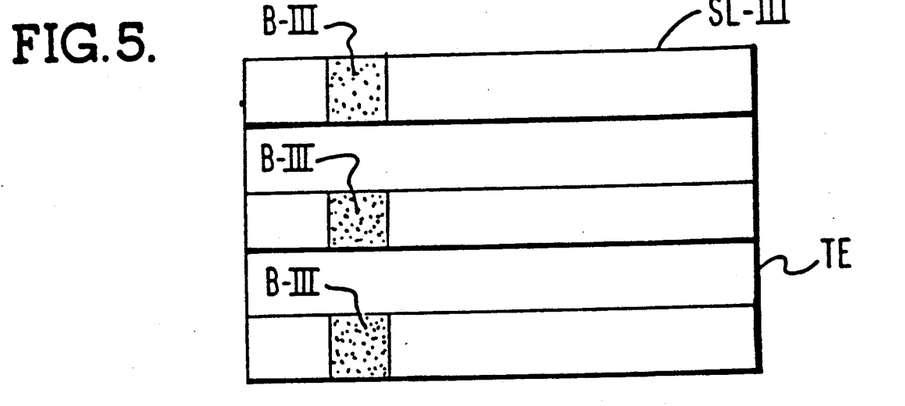
FIG. 5 is a plan view of a related 3-boss embodiment.

Slider SL-III in FIG. 5 represents another embodiment; essentially the same as SL-I in FIGS. 1-4, except that three bosses, rather than one, are applied [each on a respective rail, just aft of a respective slider ramp, as with boss B SL-I] all being identical in size and construction of course. This embodiment will perform essentially like SL-I except that, with the added boss means at the front, a "higher pitch" slider results—something that is desired in certain instances.

FOURTH EMBODIMENT, FIG. 6

Figure 6:
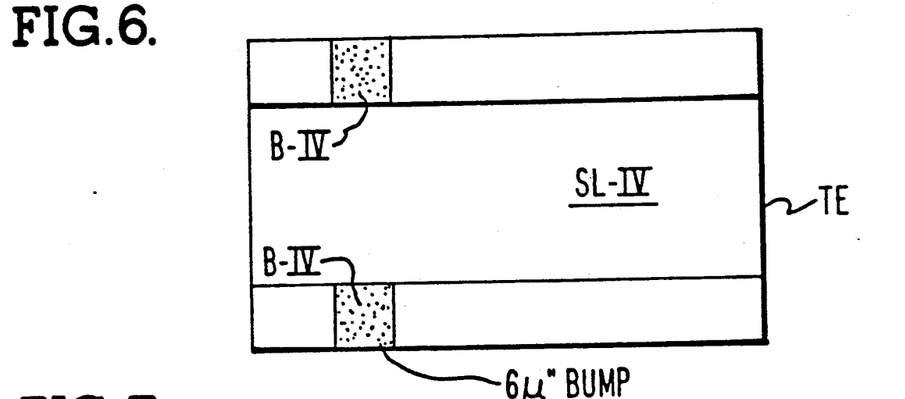
FIG. 6 is a plan view of a related 2-rail embodiment.

The embodiment of FIG. 5 (SL-III) is essentially replicated for a two-rail slider SL-IV as seen in FIG. 6, with each (identical) boss protruding about 6 micro-inches (beyond "flight-plane") and being deposited on a respective rail (each rail about 0.0167 inch wide), just aft of its respective ramp as before.

Here, the results were essentially as in the first embodiment SL-I.

FIFTH EMBODIMENT, FIGS. 7, 8

Figure 7:
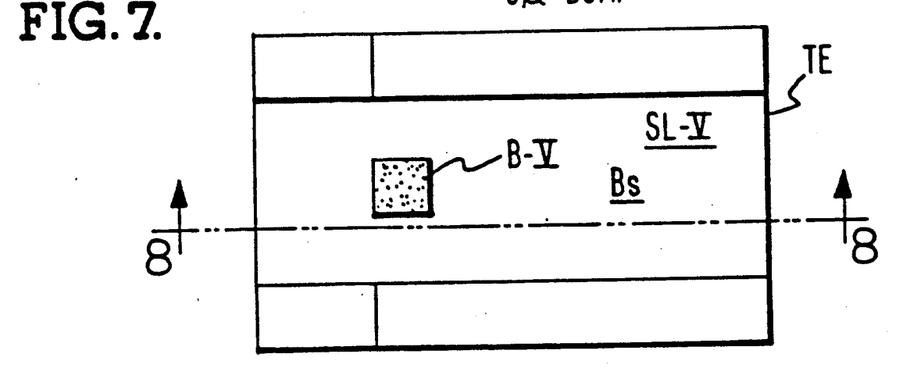
FIGS. 7 and 8 are respective plan and side views of a related "medially-mounted" boss embodiment.
Figure 8:
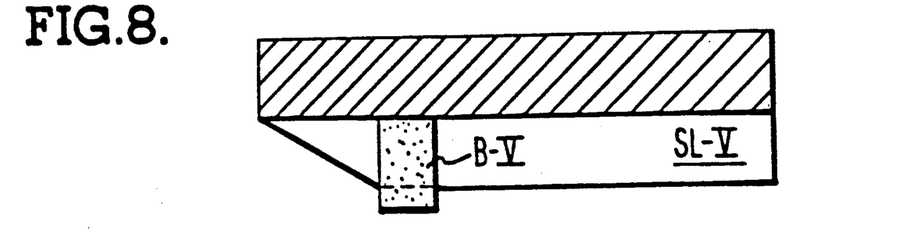

In a two-rail slider (e.g., like that of FIG. 6) SL-V, a single elongate boss means, or slug B-V, is here deposited midway between the rails and just aft of the ramp zone. This slug B-V is thus deposited on the medial ("throat") surface B$_s$ between the rails, preferably being deposited in the fashion of those in the foregoing embodiments.

Here, the results were generally as with the embodiment of FIGS. 1-4.

ALTERNATE FOURTH EMBODIMENT, FIG. 12

Figure 12:
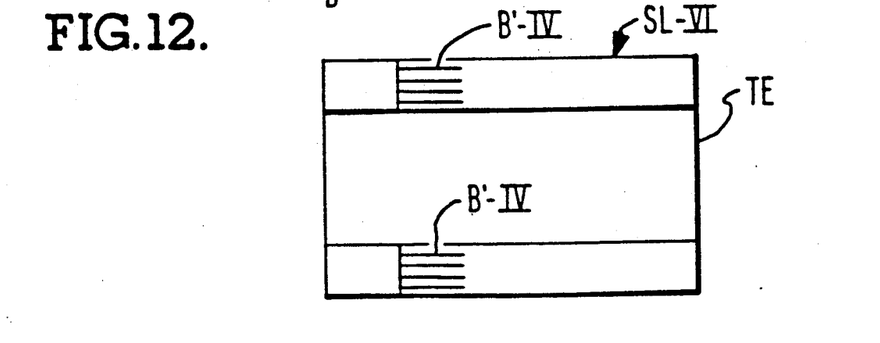
FIG. 12 is a plan view of an embodiment like that of FIG. 6 where the bosses are deformed by lapping or cold-worked.

The two-rail embodiment of FIG. 6 is replicated in FIG. 12 as modified slider SL-VI, except that, here, instead of the (2) bosses being deposited, they are "cold worked", or shaped during lapping, into an appropriate "boss site" portion of the slider rails, as workers in the art will understand. For instance, well-known techniques are feasible here—e.g., as a "roughening process", understood as raising "bumps" (micro-roughening) on the order of about 6 micro-inches above the normal slider surface.

For instance, one may readily gouge-up protrusions on the order of 50 A° above such a (slider) surface, as workers know. Such protrusions can be surprisingly effective as "multiple boss means", and appear to present no adverse side-effects (even during the brief contact with the disc during landing).

Here, the results achieved will be the same as for FIG. 6.

SIXTH EMBODIMENT, FIGS. 9-11

Figure 9:
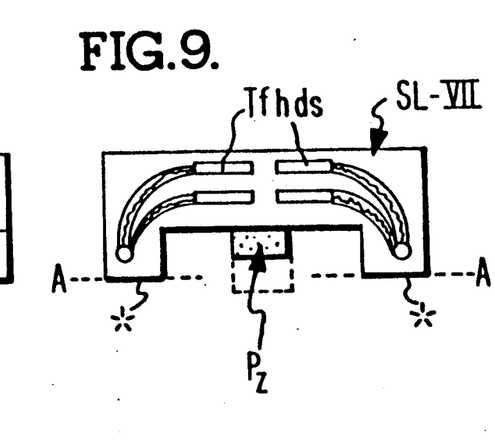
FIGS. 9-11 are respective end, plan, and side views of a related piezo-boss embodiment.
Figure 10:
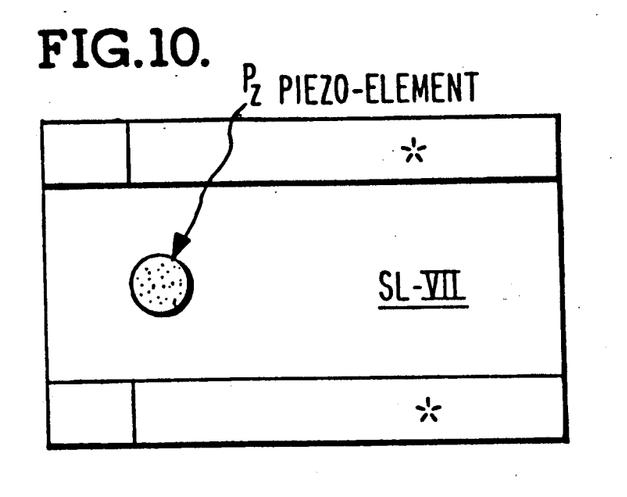
Figure 11:
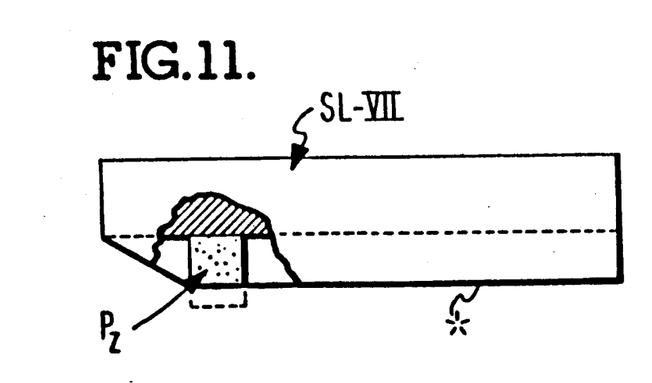

In FIGS. 9-11, another alternate embodiment SL-VII is produced by essentially replicating embodiment SL-V of FIGS. 7 and 8, but replacing slug B-V with a "piezo-slug" P$_Z$ of relatively foreshortened height, i.e., P$_Z$ is just tall enough, or almost so, to intercept the "flight-plane" A—A of the slider rail faces (air bearing surfaces ABS—like plane f—f of FIG. 4), yet not quite enough to project therebeyond—being about 0-6 micro-inches. However, once energized as understood by workers (means understood, but not shown or specified here), element P$_Z$ will "self-elongate" enough to intercept and cross the flight-plane A—A (e.g., extend 6 micro-inches or so beyond A—A; see dotted line representation of the elongation of P$_Z$ in FIGS. 9 and 11). Thus, boss P$_Z$ will be selectively thrust out to protrude like the preceding boss means, and to yield the same "protruding boss" effects during a selected "boss mode" (as with the prior embodiments, but doing so only selectively, and only when energized, as known by those skilled in the art—i.e., functioning as a "selectively-protruded boss means").

More particularly, this technique will entail embedding a small piezo-element $P_Z$ at the center of the slider, between the two co-planar air bearing surfaces [rail faces ABS] and providing selective energizing piezo-power therefor. Thus, under "Rest" (no-power) conditions, the ABS and the piezo-surface will be in roughly the same plane [possibly have been lapped together; or the piezo may be slightly "foreshortened", as mentioned above].

But, in the "energized" state, the piezo-element will elongate to protrude (a few micro-inches) beyond the ABS plane A—A. This will also introduce a "bias pitch", as before; preferably on the order of a few hundred micro-radians. Therefore, only a very small portion of the integral slider body (trailing-edge plus $P_Z$) will be in contact with the disc at "Rest", or when sliding contact is made during landing or take off.

As with the "fixed (non-piezo) protruding boss means" embodiments previously discussed, this protruding piezo-boss may be expected to radically reduce slider-disc contact as to alleviate, if not entirely eliminate, problematic stiction forces acting between the ABS surfaces and the disc lubricant. Just before the start of disc rotation, energizing power to the piezo element $P_Z$ may be turned-off, contracting the piezo-element to its non-protruding length.

A "bias pitch" of various selectible degrees can be provided when the disc is stationary merely by appropriately energizing the piezo-boss ("piezo-slug") to induce a desired associated elongation. And, the element may be energized before the disc comes to rest (that is, during landing) so that there will be sliding contact only between $P_Z$ and the slider's trailing edge. Then, if the piezo $P_Z$ is elongated before the disc stops, it can help reduce excess contact force (evidently increased hydrodynamic pressure under the piezo-boss "cushions" of the slider).

Such incorporation of a "piezo-boss" element, appropriately energized and located, is a simple technique to implement. The piezo element, being a tiny capacitance device, will consume negligible power (e.g., the voltage necessary for such operation should be in the range of 20–35 volts for an elongation of the order of a few micro-inches).

RESULTS

This embodiment, in principle, yields results like the embodiment of FIG. 7, with the added advantage that debris-generation is much less likely.

Workers who prize such advantages may deem it worth the extra expense and trouble to use the piezo form of the invention.

In a different, but related, embodiment, one may use a boss like B in SL-I or the like and provide heating means to heat the boss enough to elongate it as required [as with the piezo-boss] from a condition of coincidence with the slider plane to about 5–10 micro-inches therebeyond [e.g., one can do this with an embedded coil and selectively applying current]. Whatever boss pattern (type) is used, it may usually be located anywhere on the slider face, unless a "forward pitch" is desired.

Workers may also contemplate alternative ways of depositing such a boss such as by plating, or vapor depositing and etching - back, or vacuum deposition, flame coating, ion-gun deposition (local) oxidation, etc., as known in the art.

Now, workers might, at first blush, think that a plastic boss would be preferable, e.g., a teflon (tetrafluoroethylene) boss that has a relatively low coefficient of friction. Surprisingly, this doesn't appear to be necessary or important—although one might deposit a plastic (like teflon) by providing a suitable "adhesion-site" [e.g., epoxy bond a teflon substrate in place of the above bosses and thereafter cold working, or depositing a super-layer of teflon thereon—e.g., by vacuum evaporating teflon stock so it deposits preferentially onto this "teflon substrate"]. As workers know, it is, unfortunately, not possible to lap, or otherwise precisely machine, plastic to within a few micro-inches as required for the subject invention.

In summary, it is preferred that one, or more, fixed or extendable boss means (micro-protuberances) be provided, front and center of a slider, or else symmetrically about the forward slider end, to function as anti-stiction means, bias means and the like.

It will be understood that the preferred embodiments described herein are only exemplary, and that the invention is capable of many-modifications and variations in construction, arrangement, and use without departing from the spirit of the invention.

Further modifications of the invention are also possible. For example, the means and methods disclosed herein are also applicable to Winchester type sliders and the like, as well as to plated media, etc. Also, the present invention is applicable for providing "anti-stiction" boss means (or boss-bias means) to reduce related forces between any such smooth surfaces, especially to reduce relative friction therebetween, whether the surfaces are lubricated or not.

The above examples of possible variations of the present invention are merely illustrative. Accordingly, the present invention is to be considered as including all possible modifications and variations coming within the scope of the invention as defined by the appended claims.

What is claimed is:

1. In a magnetic disk recording slider means including a disk-confronting slider face for defining a prescribed flight-plane in its moving transducing mode, the improvement of anti-stiction piezo-electric boss means disposed on said disk-confronting face to be selectively projected, piezo-electrically, toward a subject disk when activated, said piezo-electric boss means comprising:

piezo-slug means disposed medially on the forward portion of the slider face, said slug means being selectively activateable to be sufficiently elongated to cross this "flight plane " and barely extend therebeyond; and associated piezo-slug during periods of "high stiction" and when the said slider is "landing ", or is "taking-off" or is "at rest" on an associated disk.

2. The magnetic disk recording slider means of claim 1 wherein said piezo-slug is so projectible to extend up to twenty micro-inches beyond said flight plane.

3. Magnetic disk recording slider means having anti-stiction piezo-electric boss means on a disk-confronting face thereof; said boss means to be selectively projected toward a subject disk, piezo-electrically, when activated, said piezo-electric boss means comprising:

a piezo-slug disposed medially on the forward portion of said disk-confronting face for selective activation to be elongated and projected away from said face, at least sufficient to give said carrier means a prescribed "pitch bias" when at rest on an associated disk surface.

4. The magnetic disk recording slider means of claim 3 wherein said face defines an air bearing surface; wherein
said piezo-electric boss means is activateable to be selectively projected only very slightly beyond said air-bearing-surface, just enough to counteract stiction forces, yet insufficient to seriously upset flight characteristics.

5. The magnetic disk recording slider means of claim 4 wherein said boss means is so projected twenty micro-inches or less.

6. The magnetic disk recording slider means of claim 4 wherein said air bearing surface includes a pair of disk-containing rail means, and said anti-stiction boss means is disposed centrally, between said disk-contacting rail means, with face areas aft thereof being entirely smooth.

7. The magnetic disk recording slider means of claim 4, wherein said piezo-electric boss means comprises one or more piezo-electric boss means activateable to project very slightly beyond the plane of the said air-bearing surface, sufficient to relieve stiction, yet insufficient to interfere with flight.

8. The magnetic disk recording slider means of claim 3, wherein said piezo-electric boss means has a projected height only just sufficient to relieve stiction.

9. Magnetic recording slider means having a disk-confronting face for resting upon, and interact with, the lubricated surface of a magnetic recording disk, said slider means comprising:
one or more piezo-electric boss means on forward portions of said record-confronting face; and associated activation means to selectively, piezo-electrically, activate said boss means to be projected toward a subject magnetic recording disk.

10. Improved magnetic recording slider means having a disk-confronting face defining the carrier flight-plane, and having anti-stiction piezo-electric slug means on said record-confronting face, said slug means being selectively elongated piezo-electrically when appropriately activated,
said slug means being disposed medially on the forward portion of said carrier face and having an on-elongated height which terminates at or below said '37 flight plane"; said slug means being selectively activated to be sufficiently elongated to cross said "flight plane" and extend therebeyond; and
associated piezo-activation means for so activating said piezo-slug means.

11. The magnetic recording slider means of claim 10 wherein said piezo-slug means is so activated and so elongated during periods of "high stiction".

12. The magnetic recording slider means of claim 10 wherein said piezo-slug means is so activated and so elongated when the said carrier means is "landing" or is "taking-off" or is "at rest" on an associated disk.

13. The magnetic recording slider means of claim 10 wherein said slug means is so elongate-able to extend up to twenty micro-inches beyond the said flight plane.

* * * * *